United States Patent [19]

Aznavorian

[11] Patent Number: 4,646,447
[45] Date of Patent: Mar. 3, 1987

[54] PROCESS AND PLANT FOR CONTINUOUS DRYING USING HEAT PUMPS

[76] Inventor: Arachin Aznavorian, 17 Rue Bosquet, 75007 Paris, France

[21] Appl. No.: 590,621

[22] Filed: Mar. 19, 1984

[30] Foreign Application Priority Data

Mar. 18, 1983 [FR] France .................. 83 04489

[51] Int. Cl.⁴ .............................................. F26B 3/04
[52] U.S. Cl. ........................................ 34/31; 34/35; 34/86; 34/228; 34/230
[58] Field of Search ................. 34/31, 35, 66, 86, 216, 34/227, 228, 230

[56] References Cited

U.S. PATENT DOCUMENTS

| | | | |
|---|---|---|---|
| 2,149,813 | 3/1939 | Lindstrom | 34/216 |
| 2,326,115 | 8/1943 | Arthur | 34/31 |
| 4,003,139 | 1/1977 | Van Winkle | 34/86 |
| 4,126,946 | 11/1978 | Buffington | 34/13 |
| 4,205,456 | 6/1930 | Ayers et al. | 34/86 |
| 4,299,036 | 11/1981 | Schregenberger | 34/210 |
| 4,336,279 | 6/1982 | Metzger | 427/55 |

FOREIGN PATENT DOCUMENTS

| | | |
|---|---|---|
| 2941037 | 4/1980 | Fed. Rep. of Germany . |
| 2304045 | 10/1976 | France . |
| 2461907 | 2/1981 | France . |

Primary Examiner—Albert J. Makay
Assistant Examiner—David W. Westphal
Attorney, Agent, or Firm—Young & Thompson

[57] ABSTRACT

A process and a plant for continuously drying products with the use of increasing temperatures towards the end of the drying process, the drying process using the so-called multiple transverse stirring. There is admitted in the zone of completion of the drying process a first air flow (4), the additional or major air flow being admitted in a zone (5) where the product has lost most of its moisture content, the first air flow being heated at 8(III) to a high temperature, the additional air flow (5) being heated to a mean temperature (11) and the entire air flow being subjected to heat inputs 8(I) at a mean temperature derived from at least one heat pump (13) The invention reduces the heat input required for such a process.

2 Claims, 5 Drawing Figures

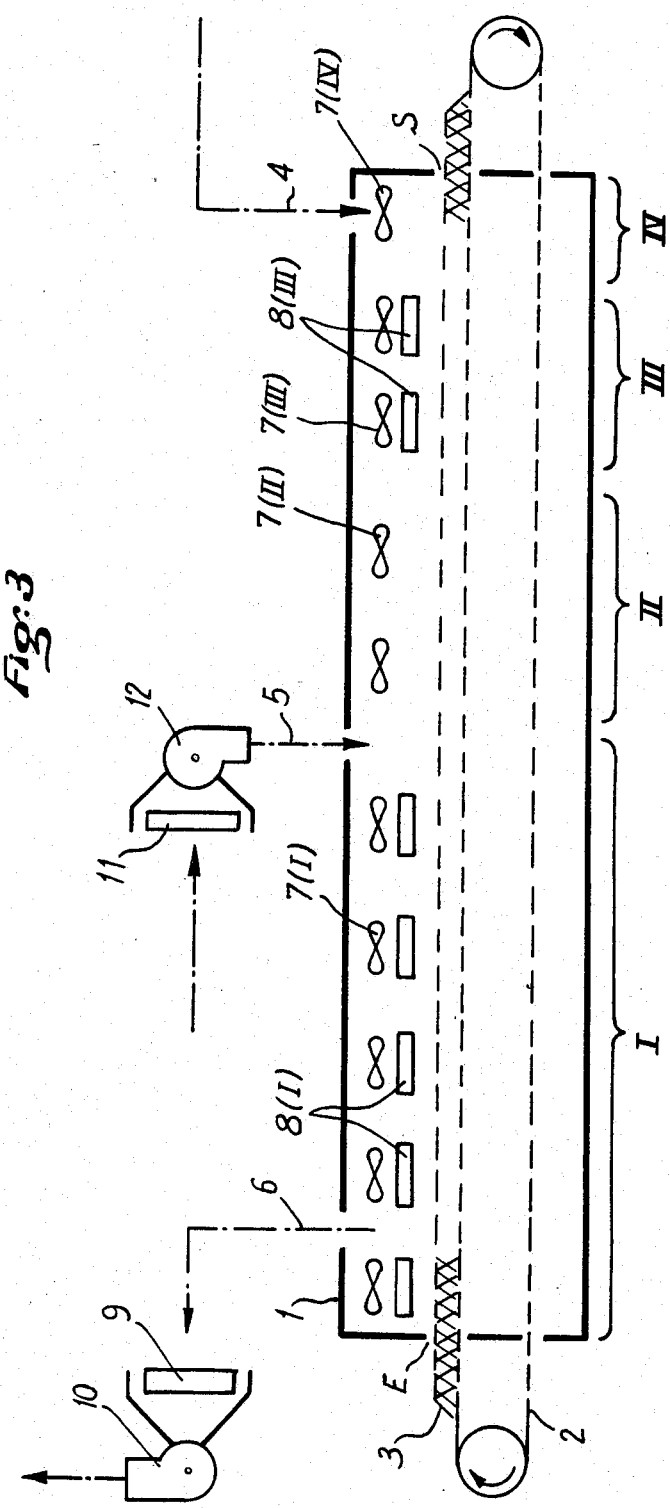

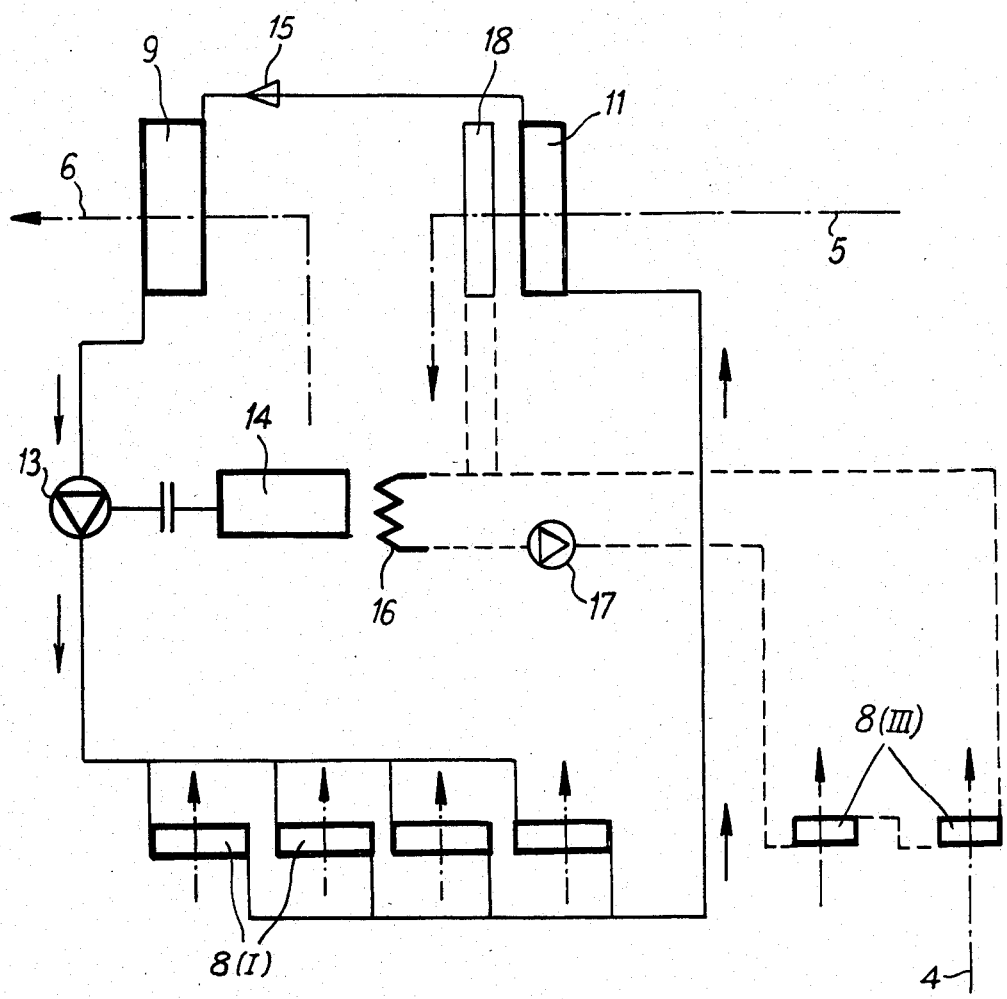

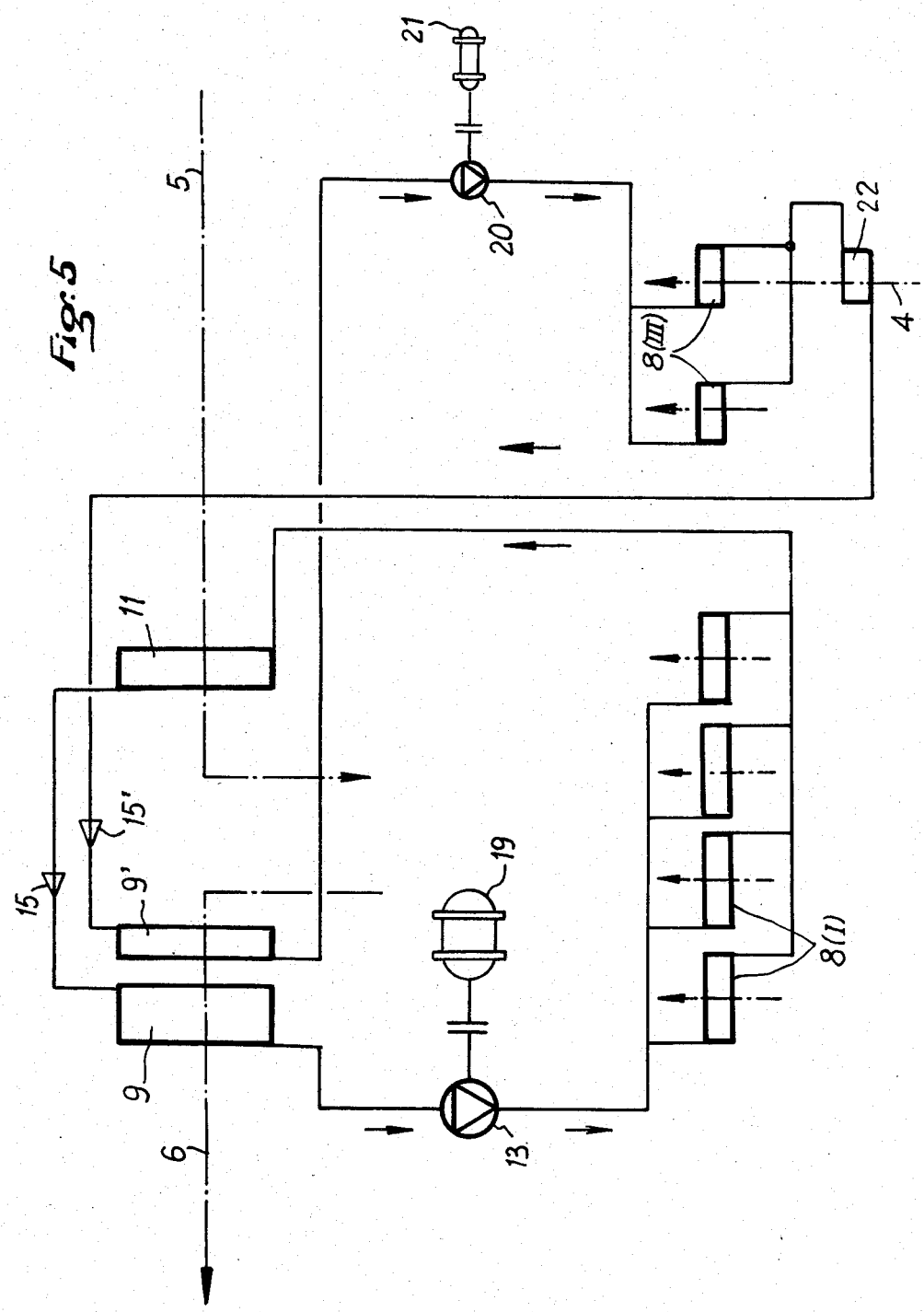

PROCESS AND PLANT FOR CONTINUOUS DRYING USING HEAT PUMPS

FIELD OF THE INVENTION

The present invention relates to a process for continuous drying of products during which drying process increasing temperatures should or can be used as well as the corresponding plant using heat-pumps.

BACKGROUND ART

Nowadays, a large number of the drying plants for products whereof the drying procedure involves the use of air flows at increasing temperatures, either for affording a thorough drying or for effecting a heat treatment (malt, bricks, tiles, etc.) have a cyclic operation, this requiring high variations of thermal power and temperature while the treatment is taking place. Moreover, the plant, of the so-called batchwise type, is ineffective during the loading and unloading steps, viz. for about 15% of the time.

As a rule, the present design of the plants intended for the above-mentioned products can hardly be adapted for the use of heat pumps due to the very high air flows involved and the substantial differences in the temperature between the withdrawn air and the air forced in. As a matter of fact, the ratio between the amount of energy supplied and that consumed by a heat pump, which is called the performance factor, is inversely proportional to the difference between the temperature at which the heat is recovered (at the evaporator) and the temperature at which the heat is restituted (at the condenser).

In some present plants a source of heat at high temperature is provided in "series" downstream of the heat pump condenser for affording the high temperatures at which air is to be forced into the plant.

While profitable, the applications of heat pumps come up against a limitation of the performances and require substantial investments, both of these factors leading to relatively long amortization times.

DISCLOSURE OF THE INVENTION

The present invention makes it possible to reduce both the initial cost and operating cost by ensuring an optimal use of heat pumps.

The present invention has for its object a process for the continuous or substantially continuous drying of products, during which drying process increasing temperatures should or can be used towards the end of the drying and using the so-called multiple transverse stirring wherein the flow of drying air is fed in countercurrent relationship to the product to be dried and transversely as it comes into contact with said product, in which there is fed into that zone corresponding to the end of the drying process a first air flow accounting for a part of the entire flow introduced, the additional air flow which constitutes the main flow being fed into a zone where the product has lost a major portion of the moisture to be removed, the first air flow being subjected, within the terminal zone of the drying process, to heat inputs at a high temperature, the additional air flow, before its admission, being heated to a mean temperature and the entire air flow being subjected, within that zone of the drying process which lies upstream of the point where the main additional flow is admitted, to heat inputs at a mean temperature or at mean temperatures, derived from at least one heat pump.

In this specification, the term "first air flow" designates that air flow which is introduced at the end of the drying process near the outlet of the enclosure and which represents but a small fraction (e.g. 1/5) of the withdrawn air flow or entire air flow used in the drying process and the term "additional air flow" designates the main fraction required to make up the entire or total air flow. Also, "high temperature" means the temperature to which the air should be brought for the product to reach the required degree of dryness and for the product temperature to be brought to the final treating temperature and "mean temperature" means the temperature representing the optimal compromise between on the one hand, the size of the plant (as determined by the drying rate) and/or the technological requirements of the product and, on the other hand, the performance factor of the heat pump used.

With the process according to this invention, the required heat may be supplied to the air flows effecting the drying from two or more sources having different temperatures, the heat input from the heat source at high temperature which has to heat merely the first air flow, i.e. a fraction, for example one fifth, of the entire air flow, to the required high temperature, represents only a small portion of the total heat input and the heat input from the source or sources at mean temperatures may be effected by using heat pumps with a high performance factor.

Preferably, the drying air flow will proceed from the zone of high temperature heat inputs to the zone of mean temperature heat inputs by flowing through a transition zone without heat input wherein its temperature becomes substantially equal to that of the heat input at mean temperature.

According to a further feature of the process, the first air flow is adjusted to afford, at the point of introduction of the additional air flow, a temperature substantially equal to that of the heat inputs at means temperature.

The plant for carrying the process into effect is of the type comprising an elongated enclosure, a continuous or substantially continuous conveyor carrying the product to be dried under a form constituting an air-permeable bed, from the inlet to the outlet of the enclosure, means for admitting into the enclosure zone which lies close to the outlet, a first flow of drying air, means to cause said air flow to pass through the product bed and means for withdrawing said air flow from the enclosure zone which lies close to the product inlet and it moreover includes, in addition to said means for admitting a first flow of drying air, means for admitting an additional flow of drying air into at least one intermediate zone of the enclosure and means for heating to a high temperature the first flow of drying air and supplying thereto within the enclosure heat at high temperature, and means for heating before its admission the air constituting the additional flow to a mean temperature and bringing into the enclosure, between the point of introduction of said additional flow and the point of extraction of the entire air flow, heat at a mean temperature.

According to another feature of the plant, the means for heating the additional air flow to a mean temperature and bringing into the enclosure heat at a mean temperature to heat the product to said mean temperature consist of the condenser or condensers of at least one heat pump recovering the heat from the moist air withdrawn from the plant. It is feasible to use several heat pumps operating at different temperatures and affording various mean temperatures along the enclosure.

According to one embodiment and when the heat pump or pumps are driven by heat engines, the means for heating the first air flow and bringing the product to a high temperature make use at least for a part, of the heat output of the engine or engines.

According to another embodiment and when the heat pump or pumps feeding the condensers at a mean temperature are driven by electric motors, the means for heating the first air flow and bringing the product to a high temperature consist of separate heat pumps operating at a high temperature.

According to a further feature, the means provided for affording heat inputs to the air flow circulated by stirring through the enclosure after it has been cooled by evaporation of water and heat exchange while flowing through the product, consist of the condensers of the heat pumps at a mean temperature.

According to another feature the fresh air constituting the additional flow is preheated by flowing over an exchanger for cooling the condensate from the condensers of the heat pumps.

According to another feature of the invention, the heat pumps operate according to the indirect condensation system, their condenser reheating the water of a hot water circuit feeding heat exchangers arranged in the enclosure.

BRIEF DESCRIPTION OF THE DRAWINGS

Further features of the present invention will become apparent from the reading the description of various embodiments which is given herebelow with reference to the diagrammatic accompanying drawings wherein:

FIG. 3 is a diagram of the plant intended to explain the process;

FIG. 4 is a diagram of the thermal circuit of the plant in the case of a regenerative heat pump driven by a thermal engine, and FIG. 5 is a diagram corresponding to FIG. 4 in the case of heat pumps driven by electric motors.

DESCRIPTION OF THE PREFERRED EMBODIMENTS

Figure 1:
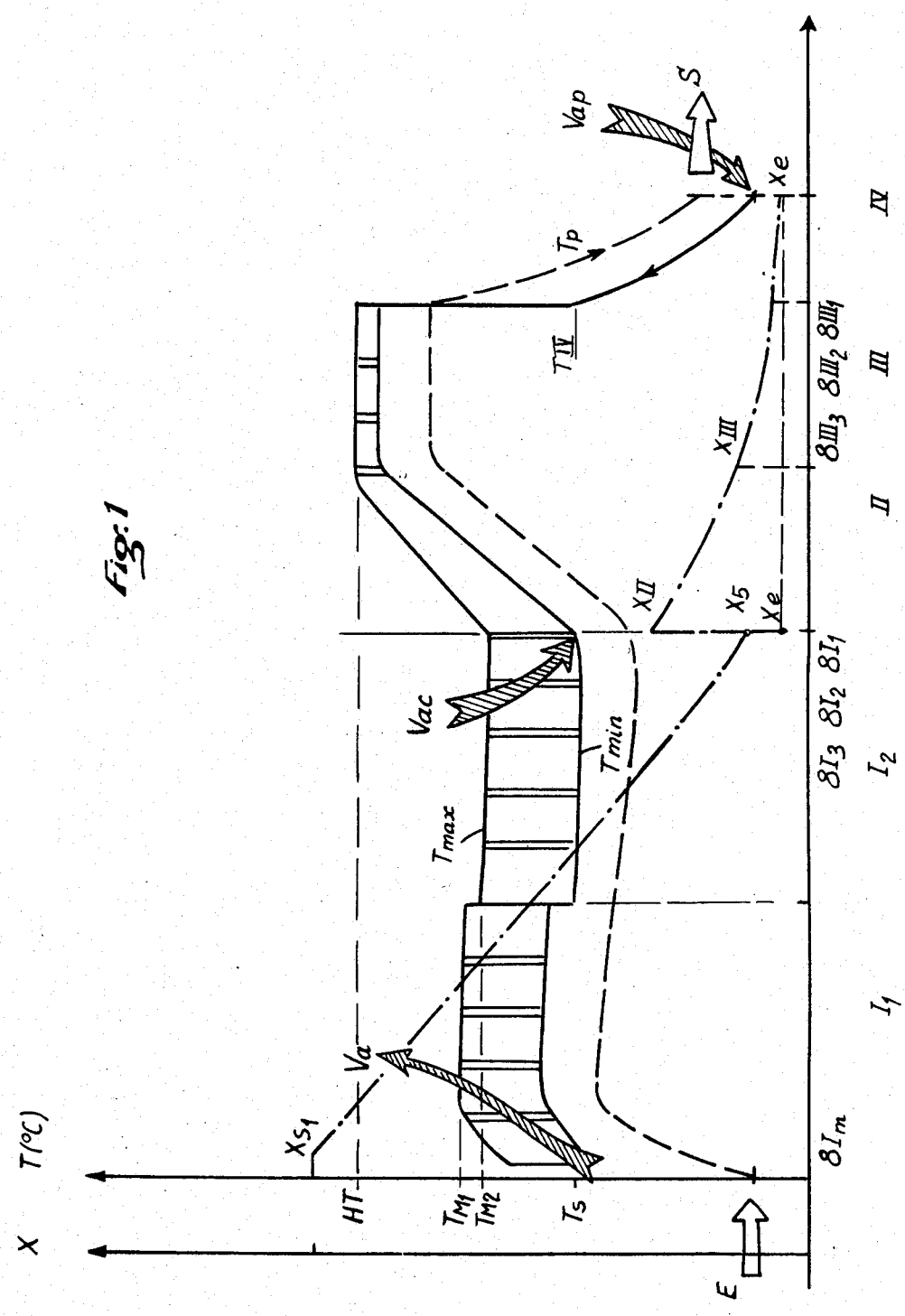
FIG. 1 is a diagram showing the variations in temperature and in water content in grams per kilogram of dry air, of the drying air as well as the product temperature.

The plant such as basically illustrated in FIG. 3, includes an elongated enclosure 1 having arranged therein a conveyor which is here represented by the upper run of a conveyor belt 2 having disposed thereon as a bed 3, the product to be dried, the conveyor belt and the bed being air-permeable. The conveyor could be of any other type such as the scoop- or rack-type, pneumatic type, fluidized bed type, etc., depending on the nature and form of the material to be dried. The product is fed into the enclosure through an inlet E and removed therefrom through an outlet S. It may flow either continuously or stepwise provided that it remains within the enclosure during the time required for the thermal exchanges. The enclosure is sub-divided into four zones I to IV the nature of which will be explained hereinafter. It includes two air inlets 4 and 5, the first being in register with zone IV and the second lying between zones I and II, and an air outlet 6 in zone I adjacent to the inlet E of the enclosure. Stirrers, such as fans 7, act to stir transversely the air flow flowing from the inlets to the outlet to cause it to pass through the product bed 3 or to flow in contact with the products in the case of shaped products. Heat exchangers 8 are provided in zones I (8(I)) and III (8(III)) and a heat pump evaporator 9 is provided in the extraction circuit 10 of outlet 6 and a condenser 11 of a heat pump or other heat exchanger is provided on the admission circuit 12 of inlet 5.

In the plant, zone I is the main zone for drying or treatment at a mean temperature wherein most of the water in the product is transferred to the drying air, zone II is a transition zone, zone III is a zone for final drying or treatment at a high temperature and zone IV is a zone for cooling the dried product.

Dry air at ambient temperature is admitted at 4 and is stirred by fan 7(IV) so as to pass through the bed 3 of product undergoing final treatment. This first flow of air Vap, according to the invention, represents a fraction e.g. the fifth of the entire air flow required for, at a temperature Ts of the air at the outlet and a water content $X_s$ in grams of water per kilogram of dry air, removing the water to be extracted from the product admitted at E. By thus flowing through the product, the air is heated to temperature T (IV) (FIG. 1). It would be possible, within the scope of the invention, to cancel zone IV but this cooling step affords recovery of the heat present in the treated product.

The flow of air stirred by fans 7(III) passes through bed 3 while flowing over heat exchangers $8(III)_1$, $8(III)_2$, $8(III)_3$. While passing over each exchanger the air flow is heated to a high temperature HT and will cool by yielding heat to the product crossed thereby to heat the same and evaporate the remaining water. Since the product is already almost dry the increase in moisture content of the air in zone III is low and the heat input required to compensate for the evaporation heat is low. This is the reason why the heat to be supplied to zone III with calories at high temperature merely represents, for example, 10-15% of the total heat input, said supply being concentrated on a restricted air flow.

In zone II, the air flow in contact with a more and more cold and more and more moist product will get burdened with moisture (from X(III) to X(II) in FIG. 1) and its temperature decreases.

There will be admitted at this time, at point 5, the additional air flow Vac, this air flow having been preferably preheated to the mean temperature $TM_2$ which is substantially equal to the temperature reached by the air flow issuing from zone II. Due to this admission of a dry air flow the moisture content of the air will drop from X(II) to $X_5$.

Within zone I, the air stirred by fans 7(I) for flowing through bed 3 and over heat exchangers $8I_1$, $8I_2$, . . . , $8I_n$ cools by evaporating water from the product and is heated while flowing over each exchanger, said exchangers being at a mean temperature TM. The entire air flow Va then issues at a temperature $Ts_1$ with a moisture content $Xs_1$.

It is feasible, as shown in the figures, to use in a first portion $I_2$ of zone I, a mean temperature $TM_2$, and to use in a second portion $I_1$ another higher mean temperature $TM_1$, this being advisable when supplies of heat at different mean temperatures are available so as to increase the performance factor of the heat pumps.

Figure 2:
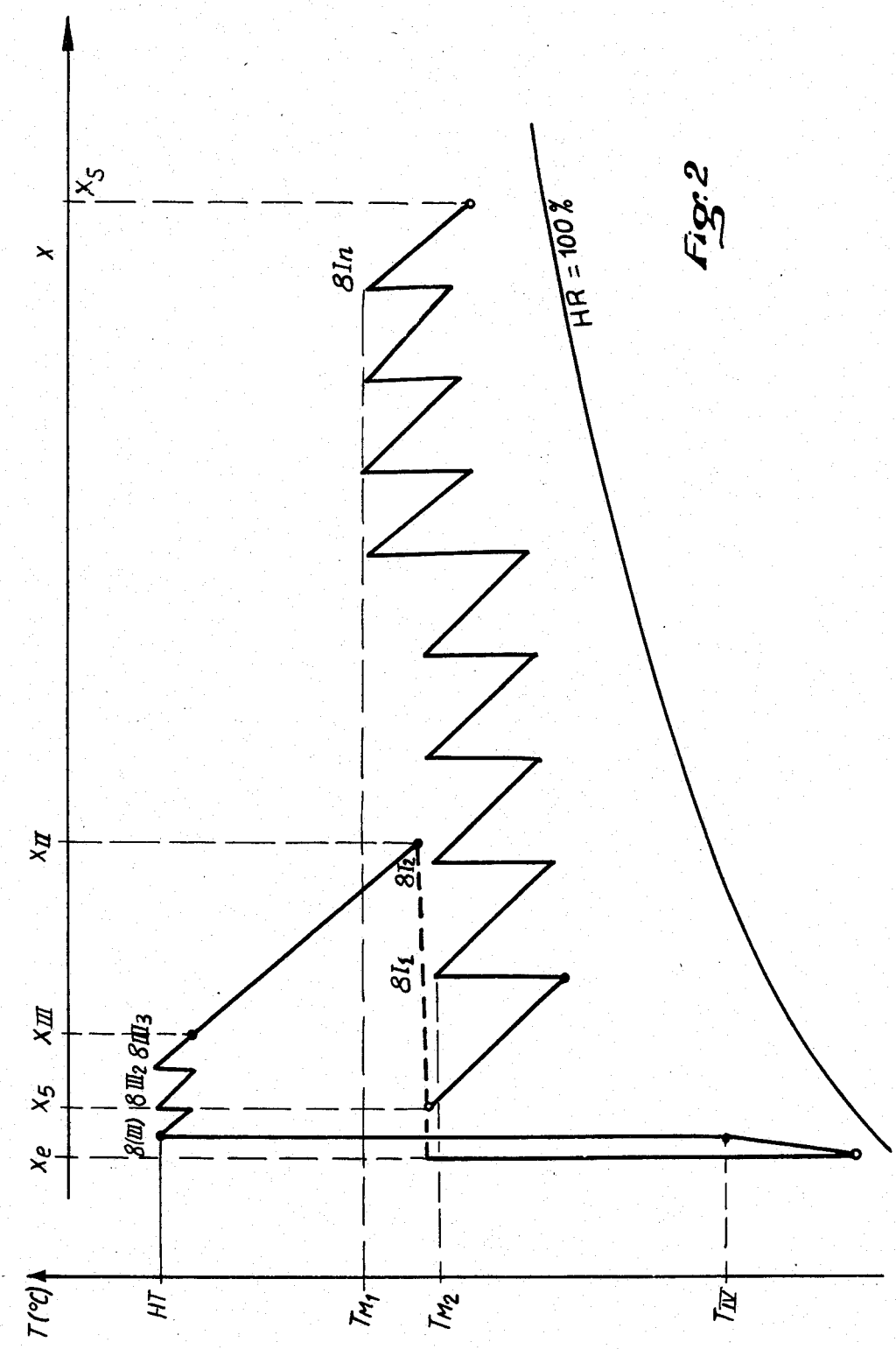
FIG. 2 is the Mollier's diagram showing the parameters of the air during the process at various points of the plant.

The curves in FIGS. 1 and 2 are simplified theoretical curves intended to explain the process. The area between the two curves Tmin and Tmax defines the variation in the temperature of the air flow by exchange with the product and with the exchangers acting to heat the same, and curve $T_p$ represents the temperature of the product, but the trends of the curves may change depending upon the moisture content of the product, the temperatures and the nature of the exchangers, etc. It is possible, and this constitutes an advantage of the process, to alter the various factors, volumes, temperatures and moisture contents of the air volumes admitted, especially to change the trend of the temperature curve of the product, e.g. by creating steps therein, and the trend of the curve (not shown) of the moisture content of the product. This allows treating by the process of this invention the most diversified products such as malt, fertilizers, fodders, alfalfa, beet pulp, textiles, non woven textiles, tiles, bricks, etc. by adapting to each product the nature of the conveyor such as fluidized bed, porous endless belt, track-type, lattice-type, scoop-type conveyors, etc.

The most significant advantage of the process lies in the reduction of the heat input at high temperature, since most of the heat input, e.g. 85–90%, is effected at mean temperatures this allowing said heat input to be effected, with a high efficiency, through heat pumps.

Two examples of plants using heat pumps are described hereunder with reference to FIGS. 4 and 5, the same reference numerals being used in both figures to designate the same elements as in FIG. 3. The circulation of air is shown by chain-dotted arrows, the circulation of the coolant fluids by full lines and that of water by dashed lines.

In the example of FIG. 4, the compressor 13 of the heat pump operating at a low temperature is driven by a heat engine 14. The compressed, hot coolant fluid is fed to the exchangers 8(1) at a mean temperature such as described above, then into a recuperative sub-cooler exchanger 11 wherein it reheats the additional fresh air admitted at 5 then, after flowing through a pressure-reducer 15, it becomes vaporized in the evaporator 9 which recovers the heat of the air outflow 6.

The heat output of heat engine 14, viz. the heat derived by cooling the engine and that present in the exhaust gases, is recovered by an exchanger 16 arranged in a hot water circuit with a circulating pump 17 which feeds the exchangers 8(III) in the high temperature final zone III. The amount of heat recovered from the heat engine is sufficient to meet the requirements for heat inputs at high temperature of zone III. Should an excess be present, then a by-pass allows this excess to be directed to an exchanger 18 for the post-heating of the additional fresh air introduced at 5 downstream of the sub-cooler regenerator 11.

In the case of FIG. 5, compressor 13 is driven by an electric motor 19 and the circuit for the heat pump is identical with that described with reference to FIG. 4. This heat pump which operates at a mean temperature and supplies the major part of the total heat input required has a high performance factor. The heat input at high temperature is also provided by a heat pump but with a lower performance factor which however supplies but a small portion of the total heat input. In the figure, 20 designates the compressor of this high temperature heat pump, 21 designates its driving electric motor, 22 designates a sub-cooler regenerator mounted downstream of the exchangers 8(III) to preheat the primary air admitted at 4, 15' designates the pressure-reducer thereof and 9' the evaporator thereof mounted in the extraction circuit of outlet 6 upstream of the evaporator 9 of the mean temperature heat pump.

I claim:

1. A process for drying of products in which the products to be dried move along an enclosed elongated path from an entry end to an exit end, with the temperature of the products increasing toward that exit end and a flow of drying air moves in countercurrent to the movement of the products, comprising feeding to said enclosed path adjacent said exit end a first air flow constituting a minor part of the entire flow of drying air, heating said first air flow to a relatively high temperature, introducing an additional air flow comprising a major part of the entire flow of drying air to a region of said path intermediate said ends, heating said additional air flow to a mean temperature substantially below said relatively high temperature by at least one heat pump that receives heat from air leaving said path at said entry end, and supplying heat to said entire air flow, between the point of introduction of said additional air flow and said entry end in an amount to maintain the flow of drying air at said mean temperature, in which said first air flow, after being heated to said relatively high temperature, passes through a first region between said exit end and said intermediate region in which it continues to receive heat sufficient to maintain it at said relatively high temperature, and then passes through a second region between said first region and said intermediate region without heat input until its temperature falls substantially below said relatively high temperature.

2. A process as claimed in claim 1, in which at least a major portion of the heat supplied to the air is supplied by heat pumps.

* * * * *